US 10,684,638 B2

(12) United States Patent
Stoufer

(10) Patent No.: US 10,684,638 B2
(45) Date of Patent: Jun. 16, 2020

(54) APPLIANCE KNOB STABILIZATION DEVICE AND RELATED METHOD

(71) Applicant: Electrolux Home Products, Inc., Charlotte, NC (US)

(72) Inventor: Paul Stoufer, Lincolnton, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 15/878,132

(22) Filed: Jan. 23, 2018

(65) Prior Publication Data
US 2019/0227588 A1 Jul. 25, 2019

(51) Int. Cl.
*G05G 1/00* (2006.01)
*F16L 5/02* (2006.01)
*G05G 1/12* (2006.01)
*F16L 5/10* (2006.01)

(52) U.S. Cl.
CPC ............. *G05G 1/12* (2013.01); *F16L 5/10* (2013.01); *G05G 2700/12* (2013.01)

(58) Field of Classification Search
CPC .. G05G 1/08; G05G 1/10; G05G 1/12; G05G 25/04; G05G 2700/12; F16L 5/00; F16L 5/025; F16L 5/10; F24C 7/081; F24C 7/082; F16C 33/08; F16C 2240/40; F16C 2240/70
USPC ...................... 16/2.1, 2.3, 2.4, 2.5
See application file for complete search history.

(56) References Cited

U.S. PATENT DOCUMENTS

| | | | |
|---|---|---|---|
| 1,218,216 A * | 3/1917 | Schmid, Jr. | H01R 4/60 16/2.1 |
| 1,386,150 A | 8/1921 | Breitenbach | |
| 2,225,472 A * | 12/1940 | Franklin | H02G 3/083 152/427 |
| 2,231,540 A | 2/1941 | Lodge | |
| 2,742,015 A | 4/1956 | Hoyle | |

(Continued)

FOREIGN PATENT DOCUMENTS

| | | | |
|---|---|---|---|
| DE | 102009047683 A1 * | 6/2011 | D06F 39/005 |
| EP | 0 327 175 | 8/1989 | |

OTHER PUBLICATIONS

Machine translation of DE 102009047683 A1 obtained on Mar. 28, 2019.*

*Primary Examiner* — Adam D Rogers
(74) *Attorney, Agent, or Firm* — Womble Bond Dickinson (US) LLP

(57) ABSTRACT

An appliance knob stabilization device includes a bushing defining a first passage receiving an appliance knob shaft of an appliance knob therein. The device includes a flange having a radially extending first surface with the bushing being integral therewith and extending axially therefrom. The first surface of the flange is mountable behind a front panel of an appliance such that the bushing extends outwardly through an opening defined in the front panel. The flange defines a second passage receiving an appliance shaft operably engaged with an actuatable component in the appliance. The first passage and the second passage cooperate to form a continuous passage. The appliance knob shaft engages the appliance shaft along the continuous passage to reduce lateral movement of the appliance knob perpendicularly to the appliance shaft during rotational actuation of the actuatable component by the appliance knob. An associated method is also provided.

13 Claims, 4 Drawing Sheets

(56) References Cited

U.S. PATENT DOCUMENTS

| | | | | |
|---|---|---|---|---|
| 2,976,377 | A * | 3/1961 | Jordan | H01H 43/12 200/38 C |
| 3,370,482 | A * | 2/1968 | Manecke | G05G 1/12 200/293 |
| 3,562,847 | A * | 2/1971 | Jemison | F16L 5/00 16/2.1 |
| 3,794,278 | A * | 2/1974 | Frey, Jr. | F16L 5/00 248/27.3 |
| 3,887,960 | A | 6/1975 | Sherman | |
| 4,363,018 | A | 12/1982 | Matsui et al. | |
| 4,495,547 | A | 1/1985 | Stoverock | |
| 4,920,823 | A * | 5/1990 | Mohr | G05G 1/10 16/441 |
| 6,231,239 | B1 * | 5/2001 | Damour | F16C 11/04 384/275 |
| 6,844,502 | B2 * | 1/2005 | Deng | H01B 17/30 174/151 |
| 8,143,535 | B2 * | 3/2012 | Auray | F16L 5/00 174/650 |
| 8,438,878 | B2 | 5/2013 | Choi et al. | |
| 9,163,667 | B2 * | 10/2015 | Blase | F16C 33/20 |
| 2008/0240631 | A1 * | 10/2008 | Keller | F16C 33/08 384/91 |
| 2012/0192379 | A1 * | 8/2012 | Amirian | F24F 13/0227 16/2.5 |
| 2017/0363140 | A1 * | 12/2017 | Hartmann | F16C 17/04 |

\* cited by examiner

400

402 — INSERTING A BUSHING THROUGH AN OPENING DEFINED BY A FRONT PANEL OF THE APPLIANCE, THE BUSHING DEFINING A FIRST PASSAGE AND HAVING A FLANGE INTEGRAL THEREWITH AND EXTENDING AXIALLY THEREFROM, THE FLANGE DEFINING A SECOND PASSAGE AND HAVING A RADIALLY EXTENDING FIRST SURFACE, AND THE FIRST AND SECOND PASSAGES COOPERATIVELY FORMING A CONTINUOUS PASSAGE, FROM BEHIND THE FRONT PANEL, SUCH THAT THE BUSHING EXTENDS OUTWARDLY THROUGH THE OPENING AND SUCH THAT THE FLANGE IS DISPOSED BEHIND THE FRONT PANEL

404 — INSERTING AN APPLIANCE SHAFT ENGAGED WITH AN ACTUATABLE COMPONENT OF THE APPLIANCE IN THE SECOND PASSAGE OF THE FLANGE

406 — INSERTING THE APPLIANCE KNOB SHAFT IN THE FIRST PASSAGE OF THE BUSHING SUCH THAT THE APPLIANCE KNOB SHAFT ENGAGES THE APPLIANCE SHAFT ALONG THE CONTINUOUS PASSAGE TO REDUCE LATERAL MOVEMENT OF THE APPLIANCE KNOB PERPENDICULARLY TO THE APPLIANCE SHAFT DURING ROTATIONAL ACTUATION OF THE ACTUATABLE COMPONENT BY WAY OF THE APPLIANCE KNOB

FIG. 4 ated method.
APPLIANCE KNOB STABILIZATION DEVICE AND RELATED METHOD

BACKGROUND

Field of the Disclosure

Aspects of the disclosure relate to appliances and, more particularly, to an appliance knob stabilization device and a related method.

Description of Related Art

Modern home appliances include components that provide for control and/or operation thereof. In recent years, advancements and continued developments in sensor technology, encoder technology, and/or processing technology have enabled the implementation of sophisticated control units and/or controllers for home appliances. Various operational components of a home appliance are controllable via a control unit and/or controller in response to various commands or user selections for controlling such operational components initiated through a control element such as, for example, an appliance knob.

A typical appliance knob includes an appliance knob shaft that engages an appliance shaft of the home appliance. The appliance shaft is associated with an actuatable component of the appliance (e.g., a gas valve) that may be disposed in spaced apart relation with respect to a panel associated with the appliance knob. Moreover, there may also be some 'play,' for example, with regard to an oversized hole in the panel of the appliance through which the appliance shaft extends, in order to allow the appliance knob shaft to align with and engage the appliance shaft. Because of this play caused by the oversized hole in the panel of the appliance and a potentially lengthy appliance shaft, manipulation of the appliance knob engaged with the appliance shaft results, for example, in up to approximately 0.635 centimeters 0.25 inches) of lateral movement or "wiggle" of the appliance knob perpendicular to the appliance shaft. Thus, it would be desirable to provide an appliance knob stabilization device for an appliance that would provide improved usability, stability, ergonomics, and user-friendliness when manipulating an appliance knob in order to control components of the appliance. Such a solution should also be capable of implementing a method for installing an appliance knob stabilization device in an appliance in existing appliances or in newly manufactured appliances.

SUMMARY

The above and other needs are met by aspects of the present disclosure which, in one embodiment, provides an appliance knob stabilization device. The appliance knob stabilization device includes a bushing defining a first passage configured to receive an appliance knob shaft of an appliance knob therein; and a flange having a radially extending first surface with the bushing being integral with and extending axially therefrom, the first surface of the flange being mountable behind a front panel of an appliance such that the bushing extends outwardly through an opening defined in the front panel, the flange defining a second passage configured to receive an appliance shaft engaged with an actuatable component therein; wherein the first passage defined by the bushing and the second passage defined by the flange cooperate to form a continuous passage, the appliance knob shaft operably engaging the appliance shaft along the continuous passage to reduce lateral movement of the appliance knob perpendicularly to the appliance shaft during rotational actuation of the actuatable component by way of the appliance knob.

In another embodiment, a method for installing an appliance knob stabilization device in an appliance is provided. The method includes inserting a bushing through an opening defined by a front panel of the appliance, the bushing defining a first passage and having a flange integral therewith and extending axially therefrom, the flange defining a second passage and having a radially extending first surface, and the first and second passages cooperatively forming a continuous passage, from behind the front panel, such that the bushing extends outwardly through the opening and such that the flange is disposed behind the front panel, inserting an appliance shaft engaged with an actuatable component of the appliance in the second passage of the flange, and inserting the appliance knob shaft in the first passage of the bushing such that the appliance knob shaft engages the appliance shaft along the continuous passage to reduce lateral movement of the appliance knob perpendicularly to the appliance shaft during rotational actuation of the actuatable component by way of the appliance knob.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

In order to assist the understanding of aspects of the disclosure, reference will now be made to the appended drawings, which are not necessarily drawn to scale and in which like reference numerals refer to like elements. The drawings are exemplary only, and should not be construed as limiting the disclosure.

FIG. 4 illustrates a method flow diagram of a method for installing an appliance knob stabilization device in an appliance according to one aspect of the present disclosure.

DETAILED DESCRIPTION

The present disclosure will now be described more fully hereinafter with reference to exemplary aspects thereof.

These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

Figures 1A, 1B:
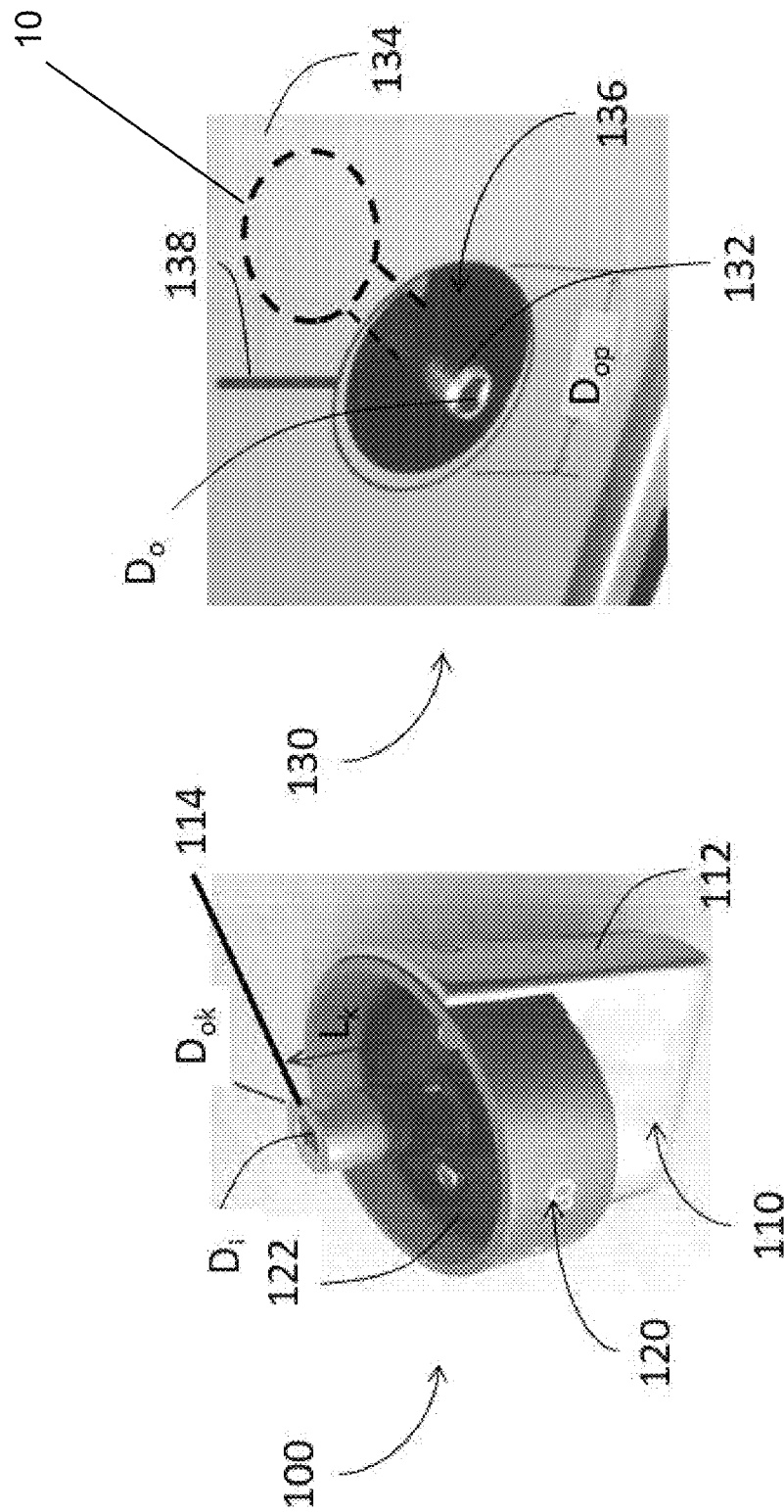
FIG. 1A illustrates an bottom perspective view of an appliance knob according to one example aspect of the present disclosure.
FIG. 1B illustrates a front perspective view of a front panel of an appliance including an appliance shaft extending through the front panel according to one example aspect of the present disclosure.

As shown in FIG. 1A, an appliance knob 100 is provided. The appliance knob 100 is an appliance knob for any conventional household or commercial appliance such as, for example, an oven, a washing machine, a stove top, etc., which incrementally adjusts appliance functionality such as temperature, wash/rinse/dry cycles, a clock, a timer, and/or the like.

The appliance knob 100 comprises a gripping component 110 and a labeled component 120. More particularly, the gripping component 110 comprises an ergonomic grip 112 about its external surface that enables a user to manipulate the appliance knob 100, e.g., for rotation thereof about an axis. An opposing internal surface of the gripping component 110 comprises an appliance knob shaft 114. The appliance knob shaft 114 may extend, for example, from a planar surface of the gripping component 110 and may be configured to operably engage a longitudinally-extending appliance shaft 132 of an appliance 130, as illustrated in FIG. 1B. In some aspects, the appliance knob shaft 114 comprises an inner diameter $D_i$ between about 0.889 centimeters (0.35 inches) and about 1.397 centimeters (0.55 inches) configured to receive an appliance shaft 132 therein, the appliance shaft 132 having an outer diameter $D_o$ smaller than the inner diameter $D_i$. Otherwise, one skilled in the art will appreciate that, in other aspects, the appliance knob shaft 114 is configured to be received within the appliance shaft 132, such that an outer diameter $D_{ok}$ of the appliance knob shaft 114 is smaller than an inner diameter of the appliance shaft 132. The labeled component 120 may be disposed adjacent to the opposing internal surface of the gripping component 110. In this manner, the labeled component 120 may comprise a central opening sized and aligned to receive the appliance knob shaft 114 therethrough. For example, and as illustrated in FIG. 1A, the internal surface of the gripping component 110 is formed to receive a first surface of a cylindrical labeled component 120. In this example, the labeled component 120 and the gripping component 110 are formed as two separate components; however, in other aspects, they may be formed as an integral component.

The appliance knob 100 may further comprise a radially extending knob base 122. The knob base 122, like the labeled component 120, may comprise a central opening sized and aligned with the central opening of the cylindrical labeled component 120 to receive the appliance knob shaft 114 therethrough, such that the appliance knob shaft 114 extends from the planar surface of the gripping component 110, through the opening defined in the labeled component 120, and through the opening defined in the knob base 122.

The knob base 122 may comprise a diameter smaller than a diameter of the second surface of the cylindrical labeled component 120 so that the knob base 122 is in fitted engagement with the cylindrical labeled component 120. One or more fastening mechanisms such as, for example, screws, bolts, glue, and the like, may be used to fasten the knob base 122 to the cylindrical labeled component 120. In some instances, a knob length $L_k$ measured from the radially extending portion of the knob base 122 to a top edge of the appliance knob shaft 114 is about 1.651 centimeters (0.65 inches) to about 2.032 centimeters (0.8 inches) in length. Preferably, the knob length $L_k$ is about 1.9304 centimeters (0.76 inches).

FIG. 1B illustrates the appliance 130 including the appliance shaft 132. In particular, FIG. 1B illustrates a front panel 134 of the appliance 130 which is used to cover internal components such as control units, controllers, actuatable components, etc. An oversized opening 136 is defined in the front panel 134 of the appliance 130 through which the appliance shaft 132 extends. The appliance shaft 132 is configured to longitudinally extend through the opening 136 at a first end and at an opposing second end be engaged with an actuatable component (not shown) of the appliance 130. The actuatable component may be spaced apart from the front panel 134 and be recessed within the appliance 130, behind the front panel 134. As such, actuation (e.g., manipulation) of the appliance shaft 132 in front of the front panel 134, results in actuation of the actuatable component of the appliance 130 behind the front panel 134. The actuatable component(s) may comprise, for example, a gas valve, a potentiometer, and the like.

Figure 2:
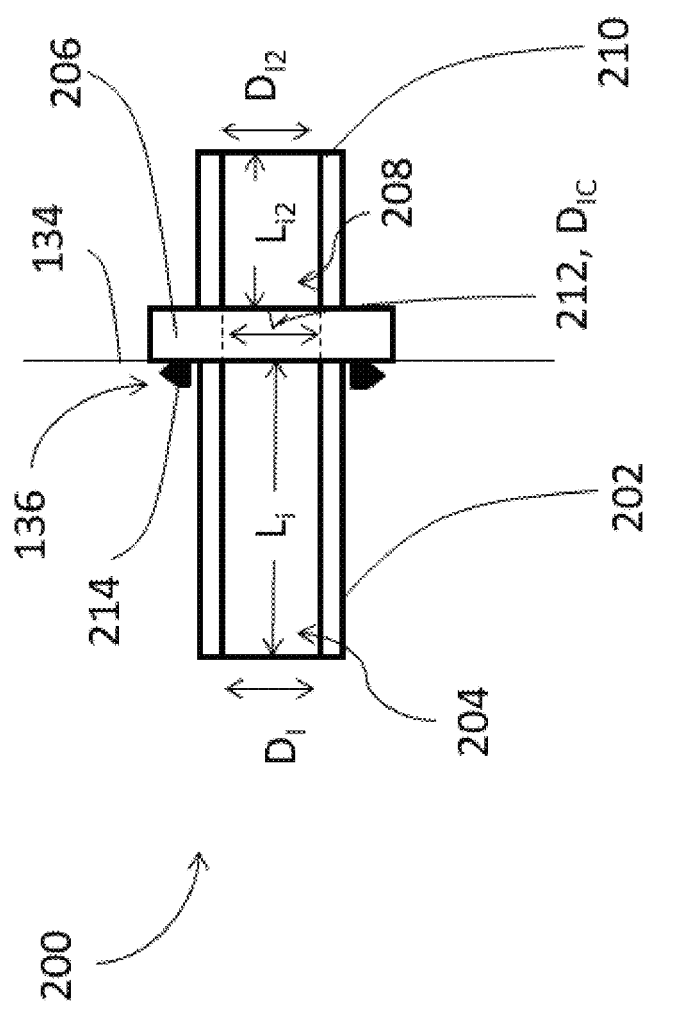
FIG. 2 illustrates a cross-section view of an appliance knob stabilization device mounted to a front panel of an appliance according to one example aspect of the present disclosure.

The opening 136 may define a diameter $D_{op}$ that may depend on a diameter of the appliance knob 100. More particularly, the opening 136 may be smaller in diameter than a diameter of the appliance knob 100. This is because manufacturing tolerances may be large, such that a large opening 136 is advantageous for facilitating engagement of the appliance knob shaft 114 with the appliance shaft 132. As such, the diameter $D_{op}$ of the opening 136 may be between about 1.905 centimeters (0.75 inches) and about 2.54 centimeters (1.0 inch). Preferably, the diameter $D_{op}$ of the opening 136 may be about 2.2606 centimeters (0.89 inches). In some aspects, in order to reduce lateral movement or "wiggle" of the appliance knob shaft 114 perpendicular to the appliance shaft 132, an appliance knob stabilization device may be utilized. FIG. 2 illustrates an exemplary appliance knob stabilization device 200 that may be used in conjunction with the appliance knob 100 and the appliance shaft 132 illustrated in FIGS. 1A, 1B. The appliance knob stabilization device 200 is configured to reduce approximately 0.635 centimeters (0.25 inches) of lateral movement of the appliance knob during manipulation by a user (e.g., during axial movement toward and away from the front panel 134 and rotation relative to the front panel 134 about the appliance shaft 132).

The appliance knob stabilization device 200 comprises a bushing or first bushing portion 202 defining a first passage 204 configured to receive an appliance knob shaft of an appliance knob therein. For example, the passage 204 of the first bushing portion 202 is configured to receive the appliance knob shaft 114 of the appliance knob 100 therein. An interior length $L_i$ of the first passage 204 and an inner diameter $D_1$ of the first passage 204 may be sized to receive the appliance knob shaft 114 therein. In some aspects, where the appliance knob shaft comprises an outer diameter $D_{ok}$ of 1.27 centimeters (0.50 inches) and a length $L_k$ of approximately 1.9304 centimeters (0.76 inches), an interior length $L_i$ of the first passage 204 may be between about 0.889 centimeters (0.35 inches) and about 1.397 centimeters (0.55 inches) and an inner diameter $D_1$ of the interior passage 204 may be between about 1.143 centimeters (0.45 inches) and about 1.524 centimeters (0.60 inches). In this manner, the appliance knob shaft 114 is configured to be received in and fully extend through the first passage 204 of the first bushing portion 202.

The appliance knob stabilization device 200 may further comprise a flange 206 having a radially extending first surface with the bushing (first bushing portion) 202 extending axially therefrom. The flange 206 and the bushing (first bushing portion) 202 may, in some aspects, be integrally formed, or may be separately formed and joined together to form a unitary component, device 200. Regardless, the device 200 may be injection molded such that the bushing 202 and the flange 204 are formed from thermoplastic polymers. Other materials such as metals, glasses, thermosetting polymers, or elastomers may also be utilized to form the device 200.

The flange 206 may define a second passage 208 configured to receive an appliance shaft (e.g., appliance shaft 132) engaged with an actuatable component 10 within the appliance. The second passage 208 may be defined by an opposing radially extending second surface of the flange 206, or may be defined by a second bushing (or second bushing portion) 210 extending from the radially extending second surface of the flange 206. As shown in FIG. 2, a first bushing portion 202 and a second bushing portion 210 are illustrated, each bushing portion defining its own respective passage 204, 208. Regardless, an interior length $L_{i2}$ of the second passage 208 and an inner diameter $D_{i2}$ of the second passage 208 may be sized to receive the appliance shaft 132 therein. For example, the interior length $L_{i2}$ of the second passage 208 is between about 0.381 centimeters (0.15 inches) and about 0.889 centimeters (0.35 inches) and the inner diameter $D_{12}$ of the second passage 204 is about 1.143 centimeters (0.45 inches) and about 1.524 centimeters (0.60 inches). Preferably, the interior length $L_2$ of the second passage 208 is about 0.635 centimeters (0.25 inches). The outer diameter $D_O$ of the appliance shaft 132 may, thus, be small enough to be received in the second passage 208.

The first passage 204 defined by the bushing 202 (or the first bushing portion) and the second passage 208 defined by the flange 206 (and/or the second bushing portion) may be configured cooperate to form a continuous passage 212. For example, and as illustrated in FIG. 2, the bushing and the flange are formed such that the first passage 204 and the second passage 208 are aligned and in communication to form the continuous passage 212. The continuous passage 212 may be defined such that an inner diameter $D_{IC}$ is sized to receive the appliance knob shaft 114 and the appliance shaft 132 in operable engagement therealong. As defined herein, "operable engagement" refers to engagement between the appliance knob shaft 114 and the appliance shaft 132 along the continuous passage 212 that allows the appliance knob to be movable in two degrees relative to the front panel 134, including axial movement toward and away from the front panel 134 parallel to the appliance shaft 132, and/or rotation relative to the front panel 134 about the appliance shaft 132. Therefore, the continuous passage 212 comprises, in some aspects, an inner diameter $D_{IC}$ large enough to receive an outer diameter $D_{ok}$ of the appliance knob shaft 114 having the appliance shaft 132 received therein.

It may be advantageous for the appliance knob shaft 114 to operably engage the appliance shaft 132 along the continuous passage 212, wherein close tolerances between the appliance knob shaft 114 and the first passage 204 and/or between the appliance shaft 132 and the second passage 208, and securement of the appliance knob stabilization device 200 to the front panel 134, results in constrained lateral movement of the appliance knob shaft 114 engaged with the appliance shaft 132, and thereby reduced lateral movement of the appliance knob 100 perpendicularly to the appliance shaft 132 during rotational actuation of the actuatable component 10 by way of the appliance knob 100. For example, the appliance knob shaft 114 operably engaging the appliance shaft 132 along the continuous passage 212 is configured to reduce about 0.635 centimeters (0.25 inches) of lateral movement of the appliance knob 100 perpendicularly to the appliance shaft 132 during rotational actuation of the actuatable component by way of the appliance knob 100.

In some aspects, the first surface of the flange 206 is mountable behind a front panel of an appliance (e.g., front panel 134 of the appliance 130) such that the bushing 202 extends outwardly through an opening (e.g., FIGS. 1B and 2, element 136) defined in the front panel 134. The flange 206 may be configured with a diameter larger than a diameter of the opening $D_{OP}$. In this manner, and as illustrated in FIG. 2, the device 200 may be inserted from behind the front panel 134, so that the first surface of the flange 206 is adjacent to the front panel 134 and the bushing 202 extends through the opening 136.

A fastening mechanism 214 may be engaged with the first surface of the flange 206 and may be configured to engage the front panel 134 so as to mount the flange 206 behind the front panel 134 of the appliance 130 such that the first bushing portion 202 extends outwardly through the opening 136 defined in the front panel 134 in a fixed manner. The fastening mechanism 214 may be any type of fastening mechanism configured to retain the device 200 in fixed engagement with the front panel 134. For example, the fastening mechanism 214 comprises resilient clips extending from the first surface of the flange behind the front panel of the appliance through the opening about the bushing. In this example, the resilient clips beneficially allow the device 200 to enter the opening 136, but prevent the device 200 from exiting the opening 136 unless lateral pressure perpendicular to the appliance shaft 132 is applied to the resilient clips. Other suitable fastening mechanisms are also contemplated, however, as will be appreciated by one skilled in the art.

Consequently, the appliance knob stabilization device 200 may be configured in any different shape, size, configuration, etc. For example, only a first bushing portion may be utilized in another embodiment of an appliance knob stabilization device, no fastening mechanisms may be utilized, etc. Regardless, the appliance knob stabilization device may be utilized to reduce lateral movement and provide improved usability, stability, ergonomics, and user-friendliness when manipulating an appliance knob to control components of an appliance.

Figure 3:
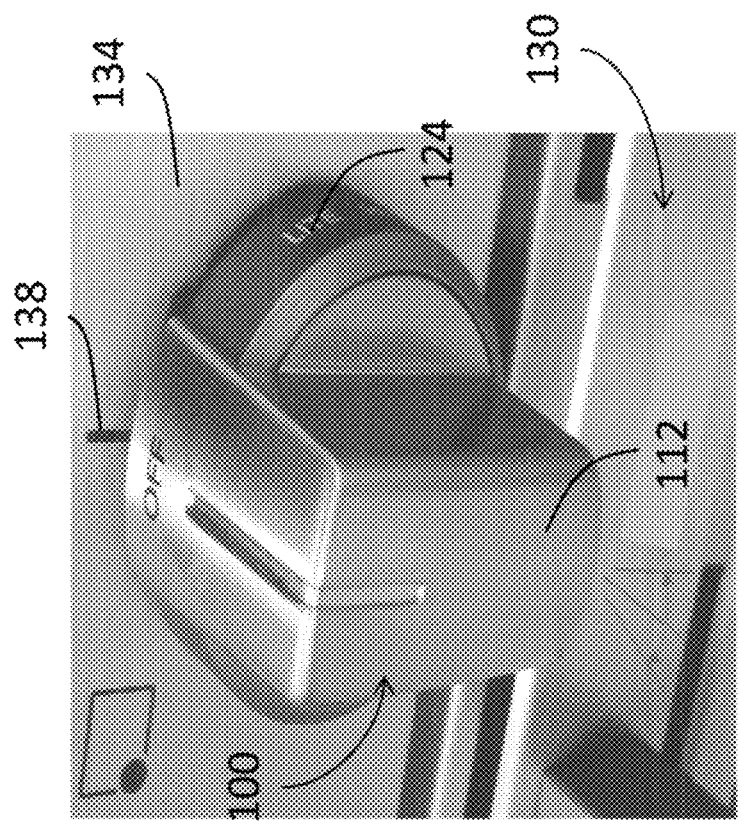
FIG. 3 illustrates a perspective view of an assembly of an appliance knob installed on a front panel of an appliance according to one example aspect of the present disclosure.

FIG. 3 illustrates an exemplary assembly 300 including the appliance knob 100 assembled on the front panel 134 of the appliance 130. The appliance 130 in assembly 300 may include the appliance knob stabilization device installed post-manufacture or during original manufacture. In use, the appliance knob 100 is configured such that axial movement of the appliance knob 100 toward or away from the front panel 134 and subsequent rotation of the appliance knob 100 relative to the front panel 134, results in actuating the actuatable component of the appliance 130. Though not able to be seen in FIG. 3, an appliance knob stabilization device (such as exemplary appliance knob stabilization device 200, FIG. 2) is provided such that axial movement of the appliance knob 100 toward and away from the front panel 134 parallel to the appliance shaft, and/or rotation relative to the front panel 134 about the appliance shaft results in reduced lateral movement of the appliance knob 100 relative to the front panel 134. An alignment mechanism 138 is provided on the front panel 134. Different actuatable states of the appliance 130 are defined by different alignments of one of the labeled notations 124 (e.g., 'OFF', 'LITE', etc.) on one of the rotating component 110 and the labeled component 120 with the alignment mechanism 138, as a degree of rotation of the actuatable component is directly related to a degree of rotation of the appliance knob 100. Thus, the chosen alignment of the alignment mechanism 138 with one of the labeled notations 124 results in a desired level of actuation of the appliance 130. As illustrated in FIG. 3, the appliance 130 is in an 'OFF' actuatable state.

A method for installing an appliance knob stabilization device in an appliance is illustrated in FIG. 4. The method, generally referred to as method 400, can be used in conjunction with the appliance knob stabilization device 200 illustrated in FIG. 2. In some aspects, the appliance knob stabilization device 200 may be configured to be installed in an existing appliance, such that an already-manufactured appliance may be modified to include the appliance knob stabilization device 200. The appliance knob stabilization device 200 may also be configured to be installed during original manufacture of an appliance.

Regardless, in a first step, 402, of the method 400, a bushing is inserted through an opening defined by a front panel of the appliance, the bushing defining a first passage and having a flange integral therewith and extending axially therefrom, the flange defining a second passage and having a radially extending first surface, and the first and second passages cooperatively forming a continuous passage, from behind the front panel, such that the bushing extends outwardly through the opening and such that the flange is disposed behind the front panel.

In a second step, 404, of the method 400, an appliance shaft engaged with an actuatable component of the appliance is inserted in the second passage of the flange.

In a third step, 406, of the method 400, the appliance knob shaft is inserted in the first passage of the bushing such that the appliance knob shaft engages the appliance shaft along the continuous passage to reduce lateral movement of the appliance knob perpendicularly to the appliance shaft.

In the method 400, in the step 402, inserting the bushing further comprises inserting a first bushing portion through the opening, the first bushing portion extending from the first surface of the flange and defining the first passage and an opposing radially extending second surface of the flange having a second bushing portion extending therefrom and defining the second passage, the first passage defined by the first bushing and the second passage defined by the second bushing cooperating to form the continuous passage, such that the flange and the second bushing portion are disposed behind the front panel.

In the method 400, in the step 406, inserting the appliance knob shaft in the first passage such that the appliance knob shaft engages the appliance shaft along the continuous passage further comprises engaging the appliance knob shaft with the appliance knob such that the appliance knob is movable in the two degrees of movement relative to the front panel, including axially moving toward and away from the front panel parallel to the appliance shaft, and rotating relative to the front panel about the appliance shaft.

The method 400 further comprises engaging a fastening mechanism, engaged with the first surface of the flange, with the front panel after inserting the bushing through the opening defined by the front panel, such that the flange is mounted behind the front panel of the appliance and such that the bushing extends outwardly through then opening defined in the front panel. Notably, in the method 400, the fastening mechanism comprises resilient clips extending from the first surface of the flange, and wherein engaging the fastening mechanism with the front panel comprises inserting the resilient clips through the opening defined by the front panel, and about the bushing from behind the front panel, to mount the flange behind the front panel of the appliance.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. An appliance knob stabilization device comprising:

a bushing defining a first passage that receives an appliance knob shaft of an appliance knob therein;

a flange having a radially extending first surface with the bushing being integral with and extending axially therefrom, the first surface of the flange being mountable behind a front panel of an appliance such that the bushing extends outwardly through an opening defined in the front panel, the flange defining a second passage that receives an appliance shaft engaged with an actuatable component therein, wherein an outer diameter of the first surface of the flange is larger than an outer diameter of the bushing and the outer diameter of the bushing is smaller than a diameter of the opening such that the bushing is insertable through the opening and the first surface of the flange is mountable behind the front panel of the appliance; and a fastening mechanism extending from the first surface of the flange through the opening and being arranged to engage a front surface of the front panel when the bushing is inserted through the opening so as to mount the flange behind the front panel of the appliance on an opposing rear surface thereof such that the bushing extends outwardly through the opening defined in the front panel, wherein the first passage defined by the bushing and the second passage defined by the flange cooperate to form a continuous passage having an inner diameter larger than outer diameters of the appliance knob shaft and the appliance shaft, the appliance knob shaft operably engaging the appliance shaft along the continuous passage so that the appliance shaft and the appliance knob shaft are together rotatable within the continuous passage, and so as to reduce lateral movement of the appliance knob perpendicularly to the appliance shaft during rotational actuation of the actuatable component by way of the appliance knob.

2. The device of claim 1, wherein the bushing comprises a first bushing portion extending from the first surface of the flange and defining the first passage configured to receive the appliance knob shaft and a second bushing portion extending from an opposing radially extending second surface of the flange and defining the second passage configured to receive the appliance shaft therein, and wherein the first passage defined by the first bushing and the second passage defined by the second bushing cooperate to form the continuous passage.

3. The device of claim 2, wherein a length of the first bushing portion is between 0.35 inches and 0.55 inches and a length of the second bushing portion is between 0.15 inches and 0.35 inches.

4. The device of claim 1, wherein the inner diameter of the continuous passage is between 0.45 inches and 0.60 inches.

5. The device of claim 4, wherein the appliance knob shaft is configured to engage the appliance shaft within the continuous passage such that the appliance knob is movable in two degrees of movement relative to the front panel, including axial movement toward and away from the front panel parallel to the appliance shaft, and rotation relative to the front panel about the appliance shaft.

6. The device of claim 1, wherein the fastening mechanism comprises resilient clips extending from the first surface of the flange behind the front panel of the appliance through the opening about the bushing.

7. The device of claim 1, wherein the appliance knob shaft operably engaging the appliance shaft along the continuous passage is configured to reduce 0.25 inches of lateral movement of the appliance knob perpendicularly to the appliance shaft during rotational actuation of the actuatable component by way of the appliance knob.

8. The device of claim 1, wherein the bushing and the flange are injection molded.

9. A method for installing an appliance knob stabilization device in an appliance, the method comprising:
inserting a bushing through an opening defined by a front panel of the appliance, the bushing defining a first passage and having a flange integral therewith and extending axially therefrom, the flange defining a second passage and having a radially extending first surface, and the first and second passages cooperatively forming a continuous passage, from behind the front panel, such that the bushing extends outwardly through the opening and such that the flange is disposed behind the front panel;
inserting an appliance shaft engaged with an actuatable component of the appliance in the second passage of the flange; and
inserting the appliance knob shaft in the first passage of the bushing such that the appliance knob shaft engages the appliance shaft along the continuous passage to reduce lateral movement of the appliance knob perpendicularly to the appliance shaft during rotational actuation of the actuatable component by way of the appliance knob.

10. The method of claim 9, wherein inserting the bushing comprises inserting a first bushing portion through the opening, the first bushing portion extending from the first surface of the flange and defining the first passage and an opposing radially extending second surface of the flange having a second bushing portion extending therefrom and defining the second passage, the first passage defined by the first bushing and the second passage defined by the second bushing cooperating to form the continuous passage, such that the flange and the second bushing portion are disposed behind the front panel.

11. The method of claim 10, wherein inserting the appliance knob shaft in the first passage such that the appliance knob shaft engages the appliance shaft along the continuous passage comprises engaging the appliance knob shaft with the appliance knob such that the appliance knob is movable in two degrees of movement relative to the front panel, including axially moving toward and away from the front panel parallel to the appliance shaft, and rotating relative to the front panel about the appliance shaft.

12. The method of claim 9, comprising engaging a fastening mechanism, engaged with the first surface of the flange, with the front panel after inserting the bushing through the opening defined by the front panel, such that the flange is mounted behind the front panel of the appliance and such that the bushing extends outwardly through the opening defined in the front panel.

13. The method of claim 12, wherein the fastening mechanism comprises resilient clips extending from the first surface of the flange, and wherein engaging the fastening mechanism with the front panel comprises inserting the resilient clips through the opening defined by the front panel, and about the bushing from behind the front panel, to mount the flange behind the front panel of the appliance.

* * * * *